United States Patent
Coon et al.

(10) Patent No.: US 11,778,422 B2
(45) Date of Patent: Oct. 3, 2023

(54) VEHICLE POSITIONING FOR V2V OPTIMIZATION

(71) Applicant: Aptiv Technologies Limited, St. Michael (BB)

(72) Inventors: Bradley Scott Coon, Russiaville, IN (US); Christopher David Ruppel, Carmel, IN (US)

(73) Assignee: Aptiv Technologies Limited, St. Michael (BB)

( * ) Notice: Subject to any disclaimer, the term of this patent is extended or adjusted under 35 U.S.C. 154(b) by 155 days.

(21) Appl. No.: 17/455,816

(22) Filed: Nov. 19, 2021

(65) Prior Publication Data

US 2023/0164518 A1    May 25, 2023

(51) Int. Cl.
| H04W 4/029 | (2018.01) |
| H04W 4/46 | (2018.01) |
| H04W 24/02 | (2009.01) |
| H04W 24/08 | (2009.01) |

(52) U.S. Cl.
CPC ............. *H04W 4/029* (2018.02); *H04W 4/46* (2018.02); *H04W 24/02* (2013.01); *H04W 24/08* (2013.01)

(58) Field of Classification Search
None
See application file for complete search history.

(56) References Cited

U.S. PATENT DOCUMENTS

| 8,352,112 B2 | 1/2013 | Mudalige |
| 8,868,324 B2 | 10/2014 | Haran |
| 10,120,003 B2 | 11/2018 | Haran et al. |
| 2017/0365171 A1* | 12/2017 | Haran ................. G01R 21/1331 |
| 2019/0072641 A1 | 3/2019 | Al-Stouhi et al. |
| 2020/0057453 A1* | 2/2020 | Laws ................... G05D 1/0088 |
| 2020/0307580 A1 | 10/2020 | Kobayashi et al. |

FOREIGN PATENT DOCUMENTS

| CN | 110213715 A | 9/2019 |
| EP | 3621274 A1 | 3/2020 |
| KR | 102141445 | 6/2018 |
| WO | 2019203712 A1 | 10/2019 |

OTHER PUBLICATIONS

Miucic, et al., "Experimental Characterization of DSRC Signal Strength Drops", 12th International IEEE Conference on Intelligent Transportation Systems, Nov. 2009, 5 pages.
"Extended European Search Report", EP Application No. 22197392. 8, dated Apr. 3, 2023, 6 pages.

* cited by examiner

*Primary Examiner* — Adolf Dsouza
(74) *Attorney, Agent, or Firm* — Sawtooth Patent Group PLLC

(57) ABSTRACT

Responsive to determining that a quality of a V2V connection between a host vehicle and a target does not satisfy a threshold, a following position of the host vehicle relative to the target and whether the following position is within a predicted null position of the V2V connection and closer to the target than a selected position are determined. The following position is then controlled based on whether the following position is within the predicted null position and whether the following position is closer to the target than the selected position. By controlling the following position based on the quality of the V2V connection and the null position, more-reliable V2V connections may be maintained, thus enabling better performance of downstream operations.

20 Claims, 8 Drawing Sheets

VEHICLE POSITIONING FOR V2V OPTIMIZATION

BACKGROUND

Vehicle-to-vehicle communication (e.g., V2V, V2X, C-V2V, C-V2X) is important for many vehicle operations (e.g., adaptive cruise control, blind-spot monitoring, cross-traffic warnings, oncoming-traffic warnings, semi-autonomous driving technologies, autonomous-driving technologies). As such technologies advance, maintaining a reliable V2V connection becomes increasingly important. One source of poor V2V connections is ground reflections. At certain distances, a receiving vehicle may receive a direct-path transmission (e.g., directly from an antenna of a transmitting vehicle) concurrently with a road-surface reflected transmission (e.g., an echo of the direct-path transmission). Receiving both transmissions can lead to a decreased reliability of the V2V connection.

SUMMARY

This document is directed to systems, components, techniques, and methods for enabling vehicle positioning for V2V optimization. The systems and components may include means (e.g., processing systems) for performing the techniques and methods described herein. Some aspects described below include a system including at least one processor that can determine whether a quality of a V2V connection between a host vehicle and a target satisfies a threshold that corresponds to a reliable connection between the host vehicle and the target. Responsive to a determination that the quality of the V2V connection satisfies the threshold, a following position of the host vehicle relative to the target can be maintained. Alternatively, responsive to a determination that the quality of the V2V connection does not satisfy the threshold, the processor can determine whether the following position is within a predicted null position of the V2V connection. The predicted null position corresponds to one or more following positions where the quality of the V2V connection does not satisfy the threshold. Responsive to a determination that the following position is within the predicted null position, the processor can cause a vehicle component of the host vehicle to advance or retreat the host vehicle out of the predicted null position. Alternatively, responsive to a determination that the following position is not within the predicted null position, the processor can cause the vehicle component to advance or retreat an incremental amount.

The techniques and methods may be performed by the above system, another system or component, or a combination thereof. Some aspects described below include a method including determining whether a quality of a V2V connection between the host vehicle and a target satisfies a threshold that corresponds to a reliable connection between the host vehicle and the target. The method also includes, responsive to determining that the quality of the V2V connection does not satisfy the threshold, determining a following position of the host vehicle relative to the target and determining whether the following position is within a predicted null position of the V2V connection. The predicted null position corresponds to one or more following positions where the quality of the V2V connection does not satisfy the threshold. The method further includes determining whether the following position is closer to the target than a selected position corresponding to a vehicle component that controls the following position. The method also includes controlling the following position based on whether the following position is within the predicted null position, and whether the following position is closer to the target than the selected position.

The components may include computer-readable storage media including instructions that, when executed by the above system, another system or component, or a combination thereof, implement the method above and other methods. Some aspects described below include computer-readable storage media including instructions that, when executed by a processor, cause the processor to: determine whether a quality of a V2V connection between the host vehicle and a target satisfies a threshold that corresponds to a reliable connection between the host vehicle and the target. Responsive to a determination that the quality of the V2V connection satisfies the threshold, a following position of the host vehicle relative to the target is maintained. Alternatively, responsive to a determination that the quality of the V2V connection does not satisfy the threshold, the instructions further cause the processor to determine whether the following position is within a predicted null position of the V2V connection. The predicted null position corresponds to one or more following positions where the quality of the V2V connection does not satisfy the threshold. Responsive to a determination that the following position is within the predicted null position, the instructions also cause the processor to cause a vehicle component of the host vehicle to advance or retreat the host vehicle out of the predicted null position. Responsive to a determination that the following position is not within the predicted null position, the instructions also cause the processor to cause the vehicle component to advance or retreat an incremental amount.

This Summary introduces simplified concepts for enabling vehicle positioning for V2V optimization that are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

Systems and techniques for enabling vehicle positioning for V2V optimization are described with reference to the following drawings that use some of the same numbers throughout to reference like or examples of like features and components.

DETAILED DESCRIPTION

Overview

Maintaining a reliable V2V connection between vehicles is an important tool in many vehicle operations. Reflections or echoes of transmission signals can degrade such connections. For example, there is often a range of distances between a target and a following vehicle where ground reflections cause a V2V connection between the vehicles to be degraded (e.g., a null position). The null position occurs because, at those distances, the ground reflections and a direct-path transmission are received by the vehicles simultaneously. Conventional positioning techniques generally fail to account for the null position, much less adapt vehicle positioning to avoid it. That is to say, traditional vehicle-positioning functions (e.g., where a host vehicle should be relative to another vehicle) often fail to account for V2V connection quality at all, much less for ground-reflection echoes. Consequently, from a V2V perspective, suboptimal vehicle positioning can occur, leading to decreased functionality of downstream vehicle operations that rely on a V2V connection.

The techniques and systems herein enable vehicle positioning for V2V optimization. Specifically, responsive to determining that a quality of a V2V connection between the host vehicle and a target does not satisfy a threshold, a following position of the host vehicle relative to the target and whether the following position is within a predicted null position of the V2V connection and closer to the target than a selected position are determined. The following position is then controlled based on whether the following position is within the predicted null position and whether the following position is closer to the target than the selected position. By controlling the following position based on the quality of the V2V connection and the null position, more-reliable V2V connections may be maintained, thus enabling better performance of downstream operations.

Example Environment

Figure 1:
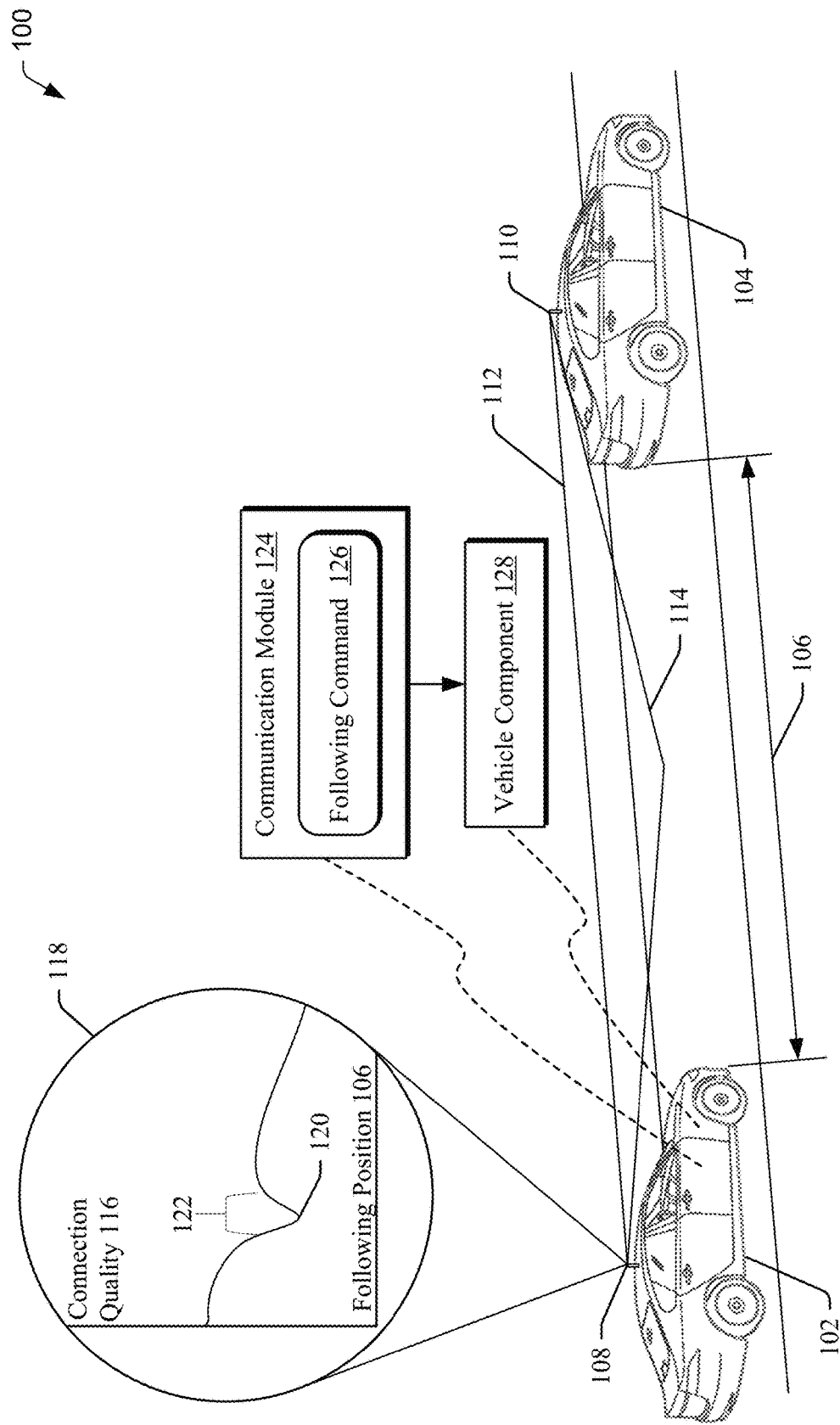
FIG. 1 illustrates, in accordance with techniques of this disclosure, an example environment where vehicle positioning for V2V optimization may be used.

FIG. 1 illustrates an example environment 100 where vehicle positioning for V2V optimization may be used. The example environment 100 contains a host vehicle 102 and a target 104. The host vehicle 102 is following the target 104, e.g., in a cruise control scenario. The host vehicle 102 is following the target 104 with a following position 106 (e.g., a distance behind the target 104).

The host vehicle 102 may be any type of system (e.g., automobile, car, truck, motorcycle, e-bike, boat, air vehicle, and so on). The target 104 may be any type of moving or stationary object with communication capabilities (e.g., automobile, car, truck, motorcycle, e-bike, boat, cyclist, and so on).

The host vehicle 102 has a host antenna 108 for a V2V connection between the host vehicle 102 and the target 104, and the target 104 has a target antenna 110 for the V2V connection. As discussed above, transmissions between the antennas are subject to reflections or echoes. For example, in the example environment 100, a transmission between the host vehicle 102 and the target 104 may have a direct path 112 and a ground-reflected path 114. When the direct path 112 and the ground-reflected path 114 are received by the host vehicle 102 concurrently, a drop in connection quality of the V2V connection may occur.

To illustrate the drop in connection quality (e.g., reliability), an example plot of connection quality 116 versus the following position 106 is shown at 118. As shown, a drop 120 occurs in the connection quality 116. The following positions 106 that correspond to the drop 120 (e.g., the following positions where the drop 120 corresponds to more than some threshold amount) are the null position 122 of the V2V connection.

The connection quality 116 may correspond to any number of metrics. For example, the connection quality 116 may be based on a signal strength (e.g., received signal strength indicator (RSSI), a packet success rate, or a packet error rate. Any known techniques may be used to measure and determine the connection quality 116.

A communication module 124 of the host vehicle 102, which is implemented at least partially in hardware, determines the connection quality 116 and generates a following command 126. The following command may comprise a maintain following position command, an incremental advance command, an incremental retreat command, a position advance command, or a position retreat command. The communication module 124 outputs the following command 126 for receipt by a vehicle component 128. The vehicle component 128 may be any downstream operation, component, or system that is able to utilize the following command 126 to control the following position 106. In some implementations, the communication module 124 may not send any following command 126 (e.g., responsive to determining that the connection quality 116 is ok). In this way, the following command 126 may only be generated when a change is needed.

By generating the following command 126 to cause the host vehicle 102 to avoid or move out of the null position 122, the techniques described herein, enable the communication module 124 to optimize positioning of the host vehicle 102 to ensure a reliable V2V connection. In doing so, downstream operations may have increased effectiveness by ensuring better communication over the V2V connection than conventional techniques.

Example System

Figure 2:
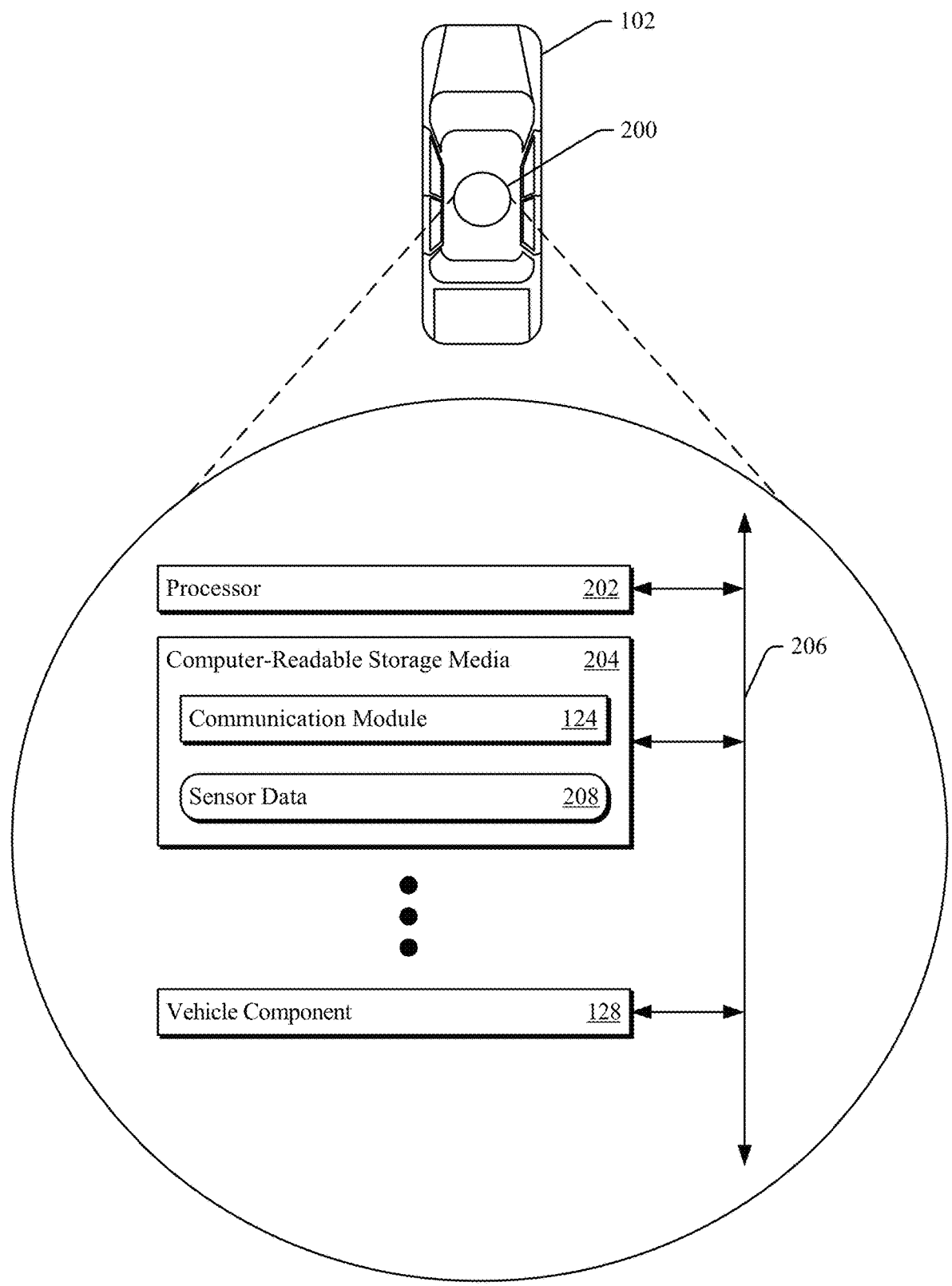
FIG. 2 illustrates, in accordance with techniques of this disclosure, an example system of a host vehicle configured to implement vehicle positioning for V2V optimization.

FIG. 2 illustrates an example system 200 configured to be disposed in the host vehicle 102 and configured to implement vehicle positioning for V2V optimization. Components of the example system 200 may be arranged anywhere within or on the host vehicle 102. The example system 200 may include at least one processor 202, computer-readable storage media 204 (e.g., media, medium, mediums), and the vehicle component 128. The components are operatively and/or communicatively coupled via a link 206.

The processor 202 (e.g., application processor, microprocessor, digital-signal processor (DSP), controller) is coupled to the computer-readable storage media 204 via the link 206 and executes instructions (e.g., code) stored within the computer-readable storage media 204 (e.g., non-transitory storage device such as a hard drive, SSD, flash memory, read-only memory (ROM)) to implement or otherwise cause the communication module 124 (or a portion thereof) to perform the techniques described herein. Although shown as being within the computer-readable storage media 204, the communication module 124 may be a stand-alone component (e.g., having dedicated computer-readable storage media comprising instructions and/or executed on dedicated hardware, such as a dedicated processor, pre-programmed field-programmable-gate-array (FPGA), system on chip (SOC), and the like). The processor 202 and the computer-readable storage media 204 may be any number of components, comprise multiple components distributed throughout the host vehicle 102, located remote to the host vehicle 102, dedicated or shared with other components, modules, or systems of the host vehicle 102, and/or configured differently than illustrated without departing from the scope of this disclosure.

The computer-readable storage media 204 also contains sensor data 208 generated by one or more sensors (not shown) that may be local or remote to the example system 200. The sensor data 208 indicates or otherwise enables the determination of information usable to perform the techniques described herein. For example, a sensor (e.g., radar sensor, sonar sensor, lidar sensor) may generate sensor data 208 corresponding to the following position 106. The host antenna 108 can also be considered a sensor that may generate sensor data 208 corresponding to the connection quality 116. The sensor data 208 may be used to determine other attributes, as will be discussed in regard to FIG. 3.

In some implementations, the sensor data 208 may come from a remote source (e.g., via link 206). The example system 200 may contain a communication system (not shown) that receives sensor data from the target 104 or another remote source. For example, the V2V connection may be used to obtain information usable to perform the techniques described herein.

The vehicle component 128 contains one or more systems or components that are communicatively coupled to the communication module 124 and configured to utilize the following command 126 to control the following position 106. For example, the vehicle component 128 may comprise one or more of a cruise-control module, a semi-autonomous or autonomous driving module, a parking module, a traffic alert module, or any other module that affects one or more vehicle operations. The vehicle component 128 may affect respective dynamics of the host vehicle 102 (e.g., speed, acceleration, heading, vehicle configuration, vehicle operation or function). The vehicle component 128 is communicatively coupled to the communication module 124 via the link 206. Although shown as separate components, the vehicle component 128 may be part of the communication module 124 and visa-versa.

By using the example system 200, the host vehicle 102 may control the following position 106 to avoid or move out of the null position 122. Doing so enables better functionality of the V2V connection between the host vehicle 102 and the target 104, thereby improving functionality of downstream operations that rely on the V2V connection. In doing so, the host vehicle 102 may provide better safety and/or experience for occupants of the host vehicle 102, the target 104, and/or other vehicles or pedestrians.

Example Data Flow

Figure 3:
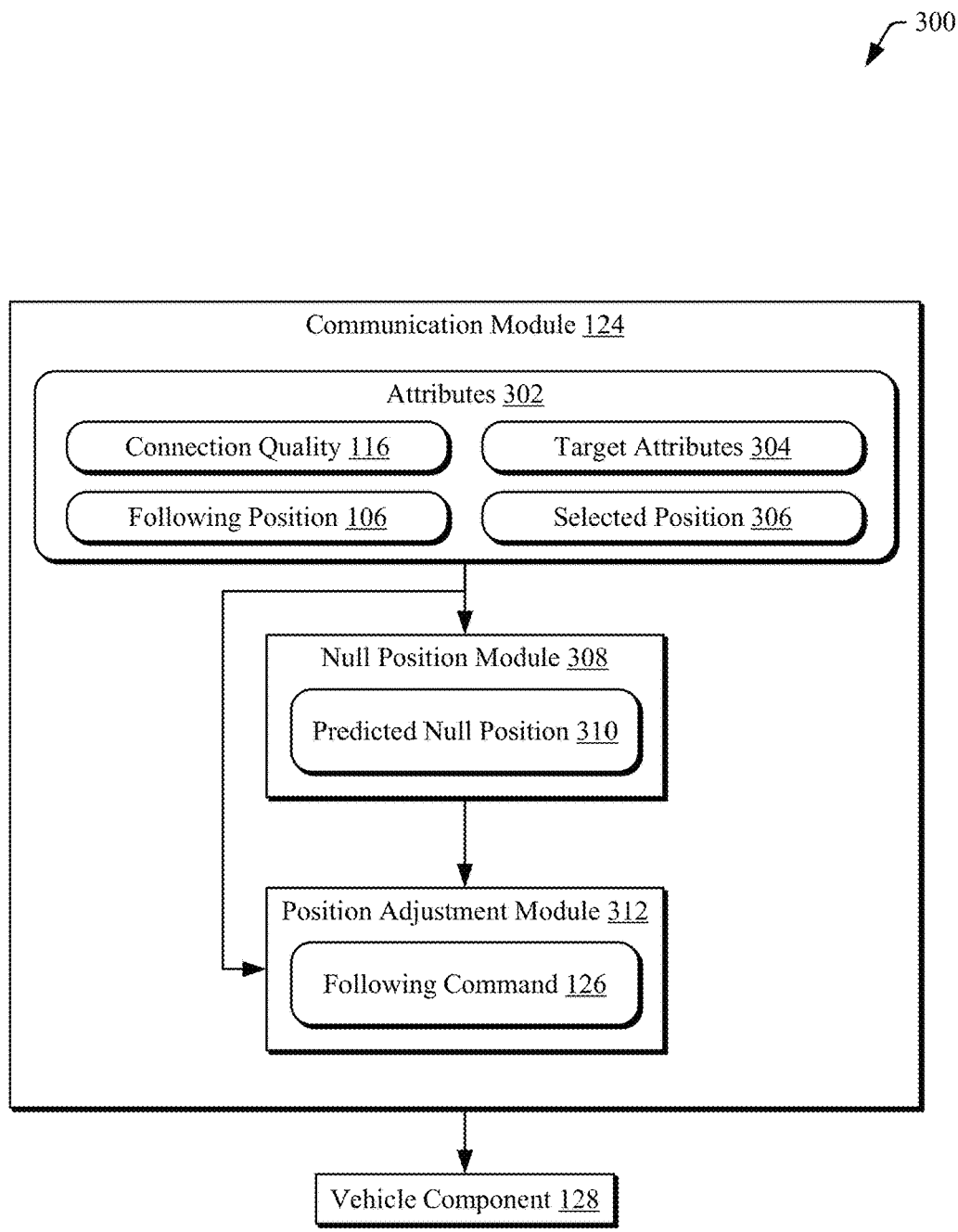
FIG. 3 illustrates, in accordance with techniques of this disclosure, an example data flow for vehicle positioning for V2V optimization.

FIG. 3 is an example data flow 300 of vehicle positioning for V2V optimization. The example data flow 300 may be implemented in any of the previously described environments and by any of the previously described systems or components. For example, the example data flow 300 can be implemented in the example environment 100 and/or by the example system 200. The example data flow 300 may also be implemented in other environments, by other systems or components, and utilizing other data flows or techniques. Example data flow 300 may be implemented by one or more entities (e.g., the communication module 124). The order in which the operations are shown and/or described is not intended to be construed as a limitation, and the order may be rearranged without departing from the scope of this disclosure. Furthermore, any number of the operations can be combined with any other number of the operations to implement the example data flow or an alternate data flow.

The example data flow 300 starts with attributes 302 of an environment (e.g., example environment 100) being obtained by the communication module 124. As shown, the attributes 302 include the connection quality 116, the following position 106, target attributes 304, and a selected position 306. The target attributes 304 may be any information about the target 104 usable to predict the null position 122, as will be discussed further below. For example, the target attributes may be an antenna height, a vehicle height, a vehicle type, or a vehicle identification number (VIN). The selected position 306 corresponds to a selected following distance or following time of the host vehicle 102 behind the target 104. For example, the selected position 306 may be a set point of the vehicle component 128, e.g., an adaptive cruise-control following set point.

The attributes 302 may be acquired, received, or determined by the communication module 124 in any way known by those of ordinary skill in the art. For example, the communication module 124 may determine the attributes 302 directly from the sensor data 208, from a bus or interface connected to sensors that interface with the example system 200, or from another module or system of the example system 200. Regardless of how or where the attributes 302 are gathered, received, derived, or calculated, the communication module 124 is configured to use the attributes 302 to determine the following command 126.

In furtherance of the example data flow 300, the attributes 302 are input into a null position module 308 of the communication module 124. The null position module 308 is configured to generate a predicted null position 310 for the V2X connection between the host vehicle 102 and the target 104. The generation of the predicted null position 310 is discussed further below in regard to FIG. 5.

The predicted null position 310 is input, along with the attributes 302, into a position adjustment module 312. The position adjustment module 312 is configured to generate the following command 126 based on the predicted null position 310 and the attributes 302. The generation of the following command 126 is discussed further below in regard to FIG. 4. The following command 126 is output for receipt by the vehicle component 128, which uses the following command 126 to maintain or adjust the following position 106. As stated above, the following position 106 may be maintained without the following command 126 (e.g., the following command 126 may only be used when changes to the following position 106 are desired).

Although shown as being within the communication module 124, the null position module 308 and/or the position adjustment module 312 may be separate from the communication module 124. For example, the null position module 308 and/or the position adjustment module 312 may be a stand-alone component and/or executed via dedicated hardware.

By using the above techniques, the following command 126 may be used to control the vehicle component 128 to control the following position 106 such that the null position 122 may be avoided. In this way, the connection quality 116 may be maintained above a threshold level, thereby ensuring a reliable V2V connection between the host vehicle 102 and the target 104. A more-reliable V2V connection leads to better performance of operations that rely on the V2V connection. The better performance allows for increased safety of passengers of the host vehicle 102, the target 104, and/or other people proximate to the host vehicle 102.

Example Process Flows

Figure 4:
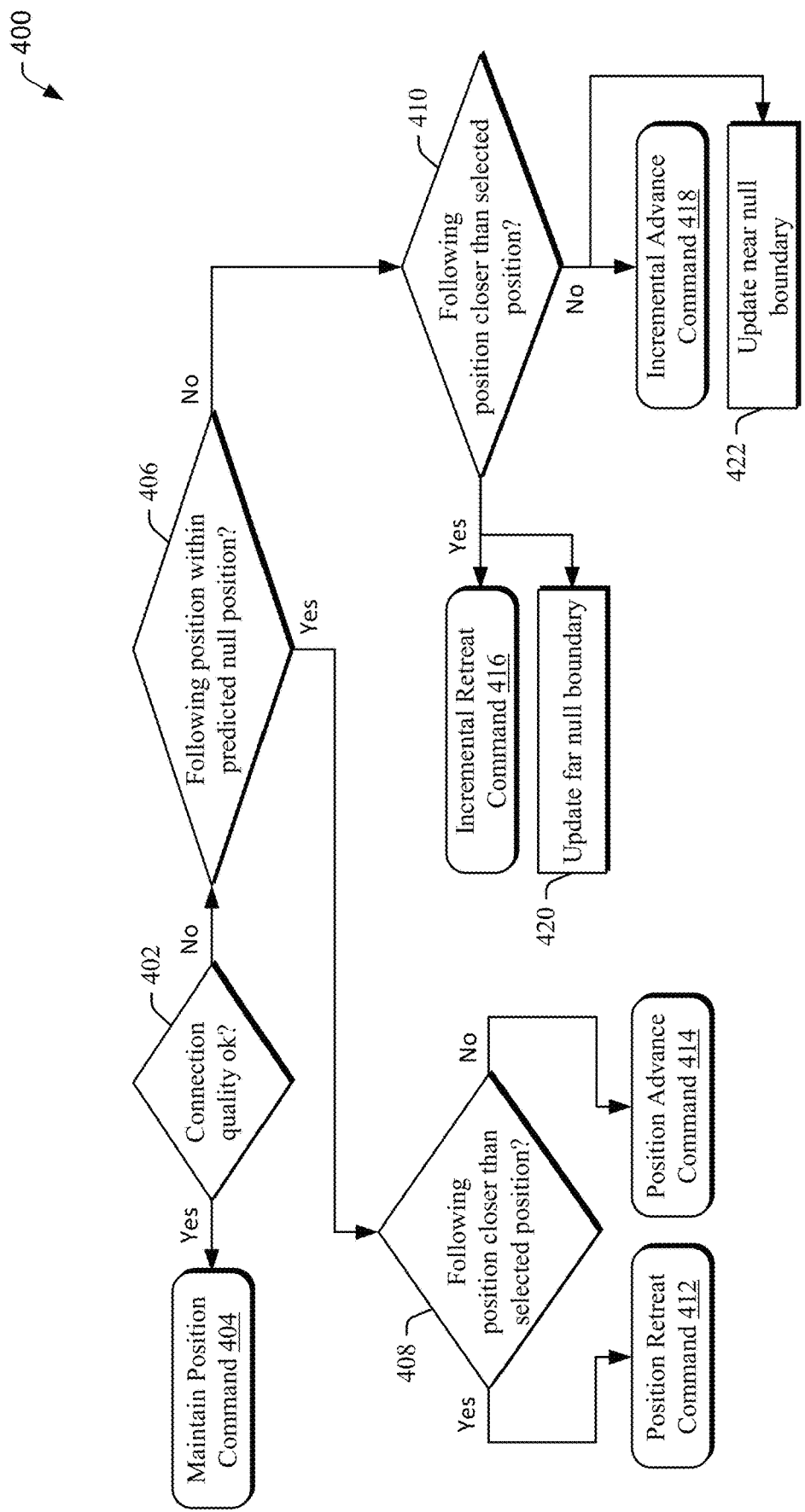
FIG. 4 illustrates, in accordance with techniques of this disclosure, an example process flow for generating the following command of FIG. 3.

FIG. 4 is an example process flow 400 for generating the following command 126. The example process flow 400 may be implemented in any of the previously described environments, by any of the previously described systems or components, and utilizing any of the previously described data flows or techniques. For example, the example process flow 400 can be implemented in the example environment 100, by the example system 200, and/or by following the example data flow 300. The example process flow 400 may also be implemented in other environments, by other systems or components, and utilizing other data flows or techniques. Example process flow 400 may be implemented by one or more entities (e.g., the position adjustment module 312). The order in which the operations are shown and/or described is not intended to be construed as a limitation, and the order may be rearranged without departing from the scope of this disclosure. Furthermore, any number of the operations can be combined with any other number of the operations to implement the example process flow or an alternate process flow.

At 402, it is determined whether the connection quality 116 is ok (e.g., if it meets a threshold). The connection quality 116 may be ok based on any quality metric. For example, it may be determined whether a packet error rate is less than a threshold amount (e.g., 10%). If the connection quality 116 is ok (e.g., a "yes" out of 402), then a maintain position command 404 may be generated. The maintain position command 404 is an example of the following command 126. In some implementations, a "yes" out of 402 may cause the communication module 124 to not output the following command 126 at all (e.g., instead of the maintain position command 404). If the connection quality 116 is not ok (e.g., a "no" out of 402), then it may be assumed that the host vehicle 102 is within the null position 122, and the example process flow 400 may proceed to 406.

At 406, it is determined whether the following position 106 is within the predicted null position 310. The calculation of the predicted null position 310 is discussed further in regard to FIG. 5, and the following position 106 is one of the attributes 302. If the following position is within the predicted null position 310 (e.g., a "yes" out of 406), then the example process flow 400 may proceed to 408. If the following position is within the predicted null position 310 (e.g., a "yes" out of 406), then the example process flow 400 may proceed to 410.

At 408, it is determined whether the following position 106 is closer to the target 104 than the selected position 306. For example, the following position 106 may vary compared to the selected position 306, even though they are related. If the following position 106 is closer than the selected position (e.g., a "yes" out of 408), then a position retreat command 412 may be generated. If the following position 106 is closer than the selected position (e.g., a "no" out of 408), then a position advance command 414 may be generated. Since the bounds of the predicted null position 310 are known, the position retreat command 412 and the position advance command 414 include respective set points for the following position 106 that are outside of the predicted null position 310. The position retreat command 412 and the position advance command 414 are examples of the following command 126. The vehicle component 128 may use the position retreat command 412 and the position advance command 414 to adjust the following position 106 such that the host vehicle 102 moves out of the null position 122.

At 410, it is also determined whether the following position 106 is closer to the target 104 than the selected position 306. If the following position 106 is closer than the selected position (e.g., a "yes" out of 410), then an incremental retreat command 416 may be generated. If the following position 106 is closer than the selected position (e.g., a "no" out of 410), then an incremental advance command 418 may be generated. The incremental retreat command 416 and the incremental advance command 418 are examples of the following command 126. The vehicle component 128 may use the incremental retreat command 416 and the incremental advance command 418 to adjust the following position 106 by an incremental amount (e.g., by 1 meter).

The connection quality 116 may be monitored after the incremental command to see if the incremental change causes the connection quality 116 to meet the threshold. If it does not, the respective incremental command (e.g., the incremental retreat command 416 or the incremental advance command 418) may be repeated until the connection quality 116 meets the threshold. When the connection quality 116 meets the threshold, the far boundary of the predicted null position 310 (e.g., the position that is further away from the target 104) may be updated at 420 when the following command 126 is the incremental retreat command 416, and the near boundary of the predicted null position 310 (e.g., the position that is closer to the target 104) may be updated at 422 when the following command 126 is the incremental advance command 418.

By generating the following command 126 based on the example process flow 400, the connection quality 116 may be maintained above the threshold while still adhering to the selected position 306. In doing so, the V2V connection between the host vehicle and the target 104 may be more reliable than conventional techniques while still maintaining the general operation of the vehicle component 128 (e.g., the selected position 306 may not be changed).

Figure 5:
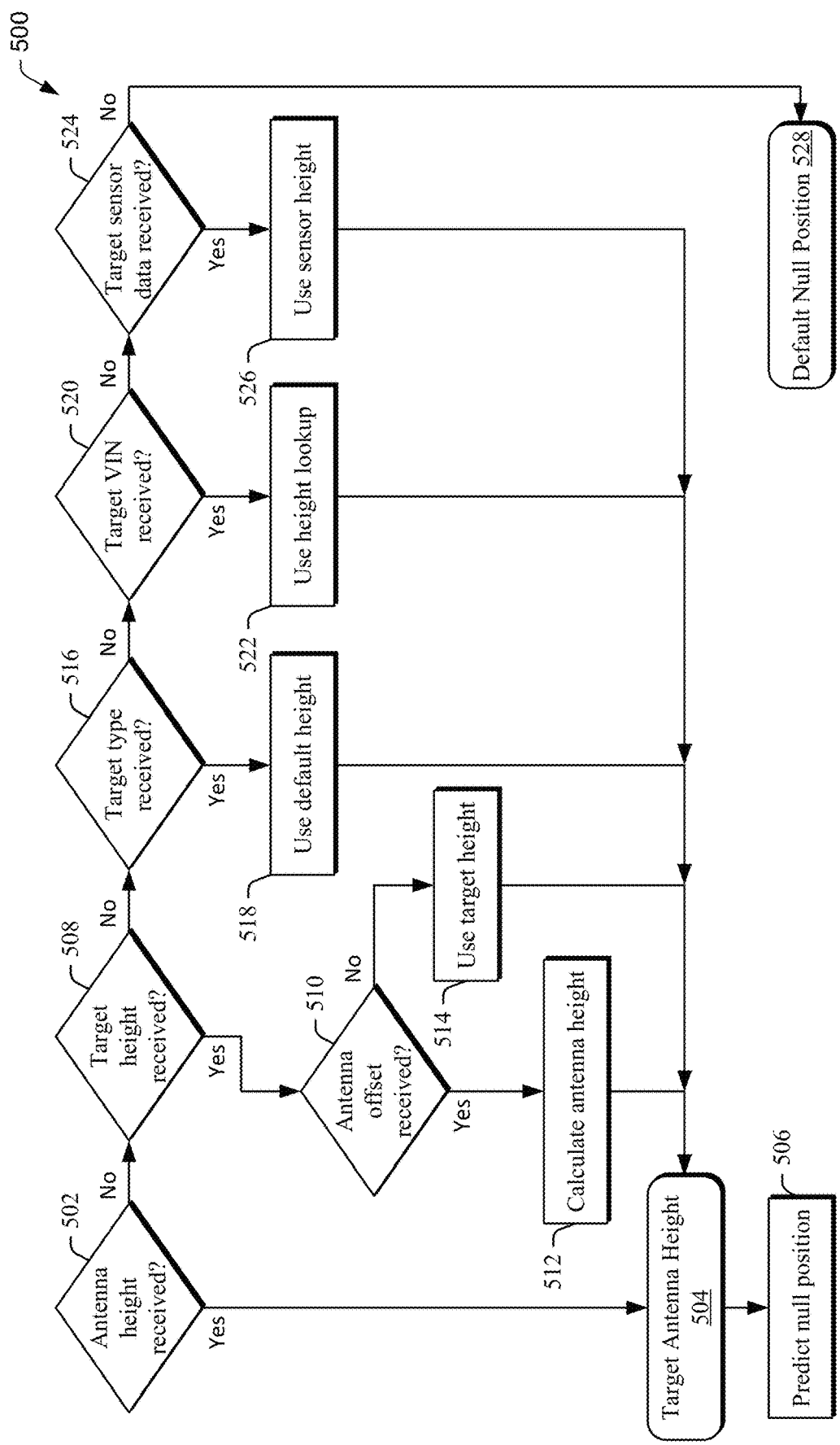
FIG. 5 illustrates, in accordance with techniques of this disclosure, an example process flow for determining the predicted null position of FIG. 4.

FIG. 5 is an example process flow 500 for generating the predicted null position 310. The example process flow 500 may be implemented in any of the previously described environments, by any of the previously described systems or components, and utilizing any of the previously described data flows or techniques. For example, the example process flow 500 can be implemented in the example environment 100, by the example system 200, and/or by following the example data flow 300. The example process flow 500 may also be implemented in other environments, by other systems or components, and utilizing other data flows or techniques. Example process flow 500 may be implemented by one or more entities (e.g., the null position module 308). The order in which the operations are shown and/or described is not intended to be construed as a limitation, and the order may be rearranged without departing from the scope of this disclosure. Furthermore, any number of the operations can be combined with any other number of the operations to implement the example process flow or an alternate process flow.

At 502, it is determined whether an antenna height of the target 104 has been received (e.g., antenna height of the target antenna 110). If the antenna height has been received (e.g., a "yes" out of 502), then the received antenna height becomes a target antenna height 504.

The target antenna height 504 is used, at 506, to generate the predicted null position 310. For example, the predicted null position 310 may be based on equation 1.

$$\frac{2h_h h_t}{\lambda} \pm 15\% \qquad (1)$$

where $h_h$ is a height of the host antenna 108, $h_t$ is the target antenna height 504, λ is a wavelength of the V2V connection, and the ±15% represents the extents the predicted null position 310 (Equation 1 calculates the center point of the predicted null position 310).

As an example, if the wavelength of the signals used for the V2V connection is 0.05 meters, then the predicted null position 310 can be calculated based on $40h_h h_t \pm 15\%$ (in meters assuming that $h_h$ and $h_t$ are also in meters). In this way, the predicted null position 310 can be calculated for varying antenna heights and spectrum used for V2V communication.

If the antenna height has not been received (e.g., a "no" out of 502), then it is determined, at 508, whether a height of the target 104 has been received (e.g., a target height). If the target height has been received (e.g., a "yes" out of 508), then the example process flow proceeds to 510.

At 510, it is determined whether an antenna offset of the target 104 has been received (e.g., where the target antenna 110 is relative to the target height). If the antenna offset has been received (e.g., a "yes" out of 510), then the target antenna height 504 is calculated, at 512, based on the target height and the antenna offset (e.g., the target height plus the antenna offset). If the antenna offset has not been received (e.g., a "no" out of 510), then, at 514, the target height becomes the target antenna height 504.

If the target height has not been received (e.g., a "no" out of 508), it is determined, at 516 whether a target type of the target 104 has been received (e.g., what type of vehicle the target 104 is). If the target type has been received (e.g., a "yes" out of 516), then, at 518, a default height for the particular target type becomes the target antenna height 504.

If the target type has not been received (e.g., a "no" out of 516), it is determined, at 520 whether a target VIN of the target 104 has been received. If the target VIN has been received (e.g., a "yes" out of 520), then, at 522, a height lookup for the particular target VIN becomes the target antenna height 504.

If the target VIN has not been received (e.g., a "no" out of 520), it is determined, at 524 whether target sensor data for the target 104 has been received. For example, the sensor data 208 may indicate information about the target 104. If the target sensor data has been received (e.g., a "yes" out of 524), then, at 526, the target sensor data is used to determine the target antenna height 504 (e.g., a height of the target 104 determined from the sensor data 208).

If the target sensor data has not been received (e.g., a "no" out of 524), then a default null position 528 may be used. The default null position 528 may be used instead of predicting the null position (e.g., at 506). The default null position 528 may be a constant (e.g., 80 meters ±15%). Thus, the predicted null position 310 is either predicted at 506 based on the target antenna height 504 or the default null position 528.

By generating the predicted null position 310 based on the example process flow 500, a more accurate predicted null position 310 may be established. In doing so, the host vehicle 102 has a better understanding of what following positions 106 may be problematic for the V2V connection with the target 104. By avoiding the predicted null position 310, the host vehicle 102 is able to better maintain reliability of the V2V connection.

Example Alternative Data Flow

Figure 6:
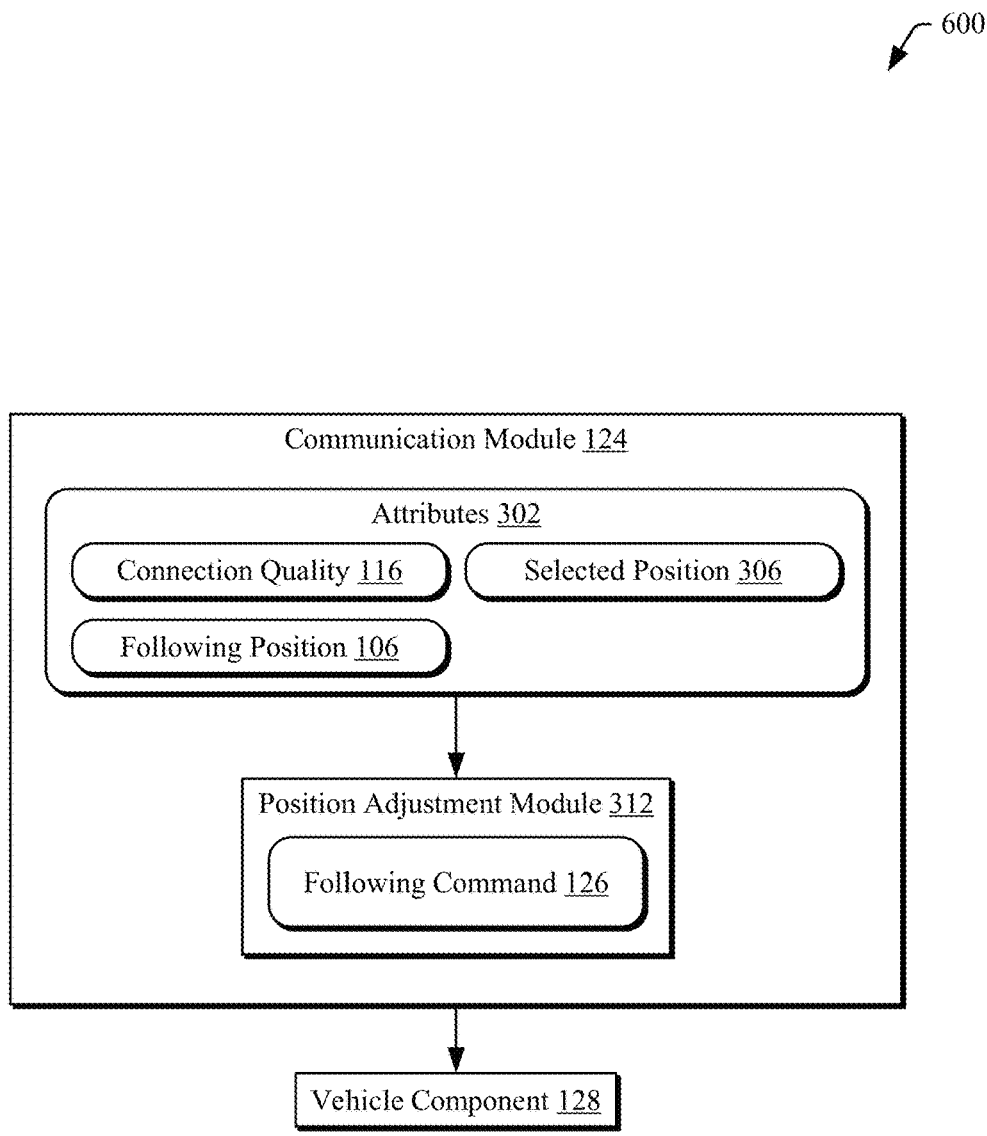
FIG. 6 illustrates, in accordance with techniques of this disclosure, another example data flow for vehicle positioning for V2V optimization.

FIG. 6 is an example data flow 600 of vehicle positioning for V2V optimization. The example data flow 600 may be implemented in any of the previously described environments and by any of the previously described systems or components. For example, the example data flow 600 can be implemented in the example environment 100 and/or by the example system 200. The example data flow 600 may also be implemented in other environments, by other systems or components, and utilizing other data flows or techniques. Example data flow 600 may be implemented by one or more entities (e.g., the communication module 124). The order in which the operations are shown and/or described is not intended to be construed as a limitation, and the order may be rearranged without departing from the scope of this disclosure. Furthermore, any number of the operations can be combined with any other number of the operations to implement the example data flow or an alternate data flow. Example data flow 600 is an alternative data flow to that of example data flow 300.

The example data flow 600 starts with the attributes 302 of an environment (e.g., example environment 100) being obtained by the communication module 124. As shown, the attributes 302 include the connection quality 116, the following position 106, and the selected position 306.

In furtherance of the example data flow 600, the attributes 302 are input into the position adjustment module 312. The position adjustment module 312, in the example data flow 600, is configured to generate the following command 126 based on the attributes 302 without the predicted null position 310. The generation of the following command 126 in the example data flow 600 is discussed further below in regard to FIG. 7. The following command 126 is output for receipt by the vehicle component 128, which uses the following command 126 to maintain or adjust the following position 106.

By using the above techniques, the following command 126 may be used to control the vehicle component 128 to control the following position 106 such that the null position 122 may be avoided (without necessitating estimating where the null position 122 is, e.g., the predicted null position 310). In this way, the connection quality 116 may be maintained above a threshold level, thereby ensuring a reliable V2V connection between the host vehicle 102 and the target 104. A more-reliable V2V connection leads to better performance of operations that rely on the V2V connection. The better performance allows for increased safety of passengers of the host vehicle 102, the target 104, and/or other people proximate to the host vehicle 102.

Example Alternative Process Flow

Figure 7:
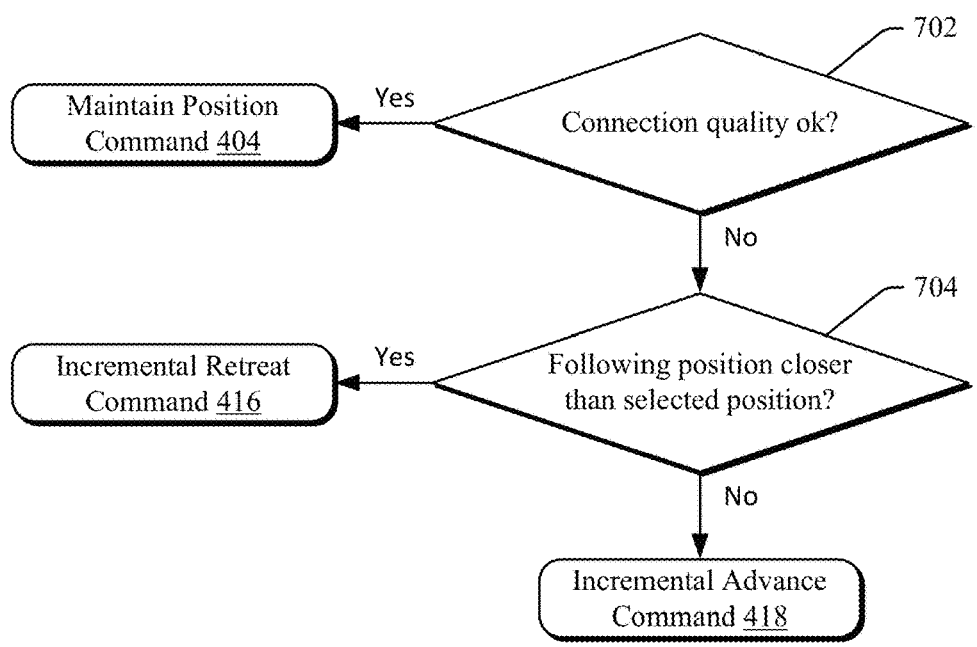
FIG. 7 illustrates, in accordance with techniques of this disclosure, an example process flow for generating the following command of FIG. 6.

FIG. 7 is an example process flow 700 for generating the following command 126 of example data flow 600. The example process flow 700 may be implemented in any of the previously described environments, by any of the previously described systems or components, and utilizing any of the previously described data flows or techniques. For example, the example process flow 700 can be implemented in the example environment 100, by the example system 200, and/or by following the example data flow 600. The example process flow 700 may also be implemented in other environments, by other systems or components, and utilizing other data flows or techniques. Example process flow 700 may be implemented by one or more entities (e.g., the position adjustment module 312). The order in which the operations are shown and/or described is not intended to be construed as a limitation, and the order may be rearranged without departing from the scope of this disclosure. Furthermore, any number of the operations can be combined with any other number of the operations to implement the example process flow or an alternate process flow. Example process flow 700 is an alternative data flow to that of example process flow 400.

At 702, it is determined whether the connection quality 116 is ok (e.g., if it meets a threshold). The connection quality 116 may be ok based on any quality metric. For example, it may be determined whether a packet error rate is less than a threshold amount (e.g., 10%). If the connection quality 116 is ok (e.g., a "yes" out of 702), then the maintain position command 404 may be generated or no position command may be generated. If the connection quality 116 is not ok (e.g., a "no" out of 702), then it may be assumed that the host vehicle 102 is within the null position 122, and the example process flow 700 may proceed to 704.

At 704, it is determined whether the following position 106 is closer to the target 104 than the selected position 306. If the following position 106 is closer than the selected position (e.g., a "yes" out of 704), then the incremental retreat command 416 may be generated. If the following position 106 is closer than the selected position (e.g., a "no" out of 704), then the incremental advance command 418 may be generated. The vehicle component 128 may use the incremental retreat command 416 and the incremental advance command 418 to adjust the following position 106 by an incremental amount (e.g., by 1 meter).

The connection quality 116 may be monitored after the incremental command to see if the incremental change causes the connection quality 116 to meet the threshold. If it does not, the respective incremental command (e.g., the incremental retreat command 416 or the incremental advance command 418) may be repeated until the connection quality 116 meets the threshold.

By generating the following command 126 (e.g., the maintain position command 404, the incremental retreat command 416, or the incremental advance command 418) or no following command 126 based on the example process flow 700, the connection quality 116 may be maintained above the threshold while still adhering to the selected position 306. Furthermore, example process flow 700 does not use the predicted null position 310 in the generation of the following command. Consequently, the position adjustment module 312 may generate the following command 126 more efficiently.

Example Method

Figure 8:
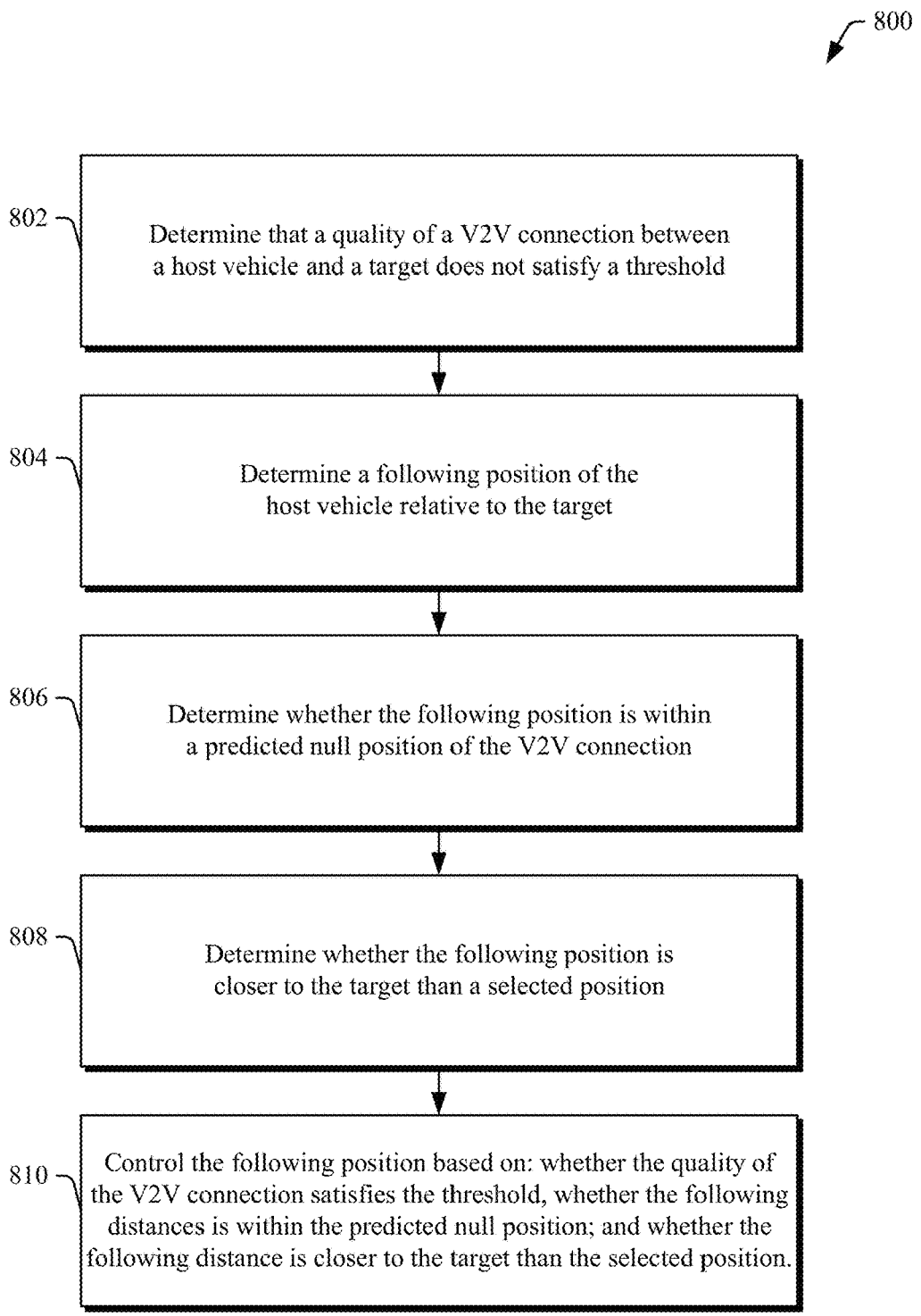
FIG. 8 illustrates, in accordance with techniques of this disclosure, an example method of vehicle positioning for V2V optimization.

FIG. 8 is an example method 800 for vehicle positioning for V2V optimization. The example method 800 may be implemented in any of the previously described environments, by any of the previously described systems or components, and utilizing any of the previously described data flows, process flows, or techniques. For example, the example method 800 can be implemented in the example environment 100, by the example system 200, by following the example data flows 300 and 600, and/or by following the example process flows 400, 500, and 700. The example method 800 may also be implemented in other environments, by other systems or components, and utilizing other data flows, process flows, or techniques. Example method 800 may be implemented by one or more entities (e.g., the communication module 124). The order in which the operations are shown and/or described is not intended to be construed as a limitation, and the order may be rearranged without departing from the scope of this disclosure. Furthermore, any number of the operations can be combined with any other number of the operations to implement the example process flow or an alternate process flow.

At 802, it is determined that a quality of a V2V connection between a host vehicle and a target does not satisfy a threshold. For example, the communication module 124 may determine that the connection quality 116 of the V2V connection between the host vehicle 102 and the target 104 does not satisfy a threshold (e.g., a certain packet error rate, success rate, or signal strength).

At 804, a following position of the host vehicle relative to the target is determined. For example, the communication module 124 may determine or calculate the following position 106.

At 806, it is determined whether the following position is within a predicted null position of the V2V connection. For example, the null position module 308 may determine the predicted null position 310, and the position adjustment module 312 may determine whether the following position 106 is within the predicted null position 310.

At 808, it is determined whether the following position is closer to the target than a selected position. For example, the position adjustment module 312 may determine whether the following position 106 is closer to the target 104 than the selected position 306.

At 810, the following position is controlled based on: whether the quality of the V2V connection satisfies the threshold, whether the following position is within the predicted null position; and whether the following position is closer to the target than the selected position. For example, the position adjustment module 312 may generate the following command 126 (e.g., the maintain position command 404, the position retreat command 412, the position advance command 414, the incremental retreat command 416, or the incremental advance command 418) based on 402, 406, and 408/410.

By influencing a following position based on the example method 800, a connection quality of a V2V connection may be maintained by effectively avoiding a null position of the V2V connection. In doing so, the V2V connection may be more reliable than conventional techniques while still maintaining a general operation of a vehicle component that controls the following position (e.g., the influencing does not adversely affect the general operation).

EXAMPLES

Example 1: A method performed by a system of a host vehicle, the method comprising: determining whether a quality of a vehicle-to-vehicle (V2V) connection between the host vehicle and a target satisfies a threshold that corresponds to a reliable connection between the host vehicle and the target; and responsive to determining that the quality of the V2V connection does not satisfy the threshold: determining a following position of the host vehicle relative to the target; determining whether the following position is within a predicted null position of the V2V connection, the predicted null position corresponding to one or more following positions where the quality of the V2V connection does not satisfy the threshold; determining whether the following position is closer to the target than a selected position corresponding to a vehicle component that controls the following position; and controlling the following position based on whether the following position is within the predicted null position and whether the following position is closer to the target than the selected position.

Example 2: The method of example 1, wherein the controlling the following position comprises causing the vehicle component to adjust the following position by: advancing the host vehicle toward the target or retreating the host vehicle away from the target.

Example 3: The method of example 1 or 2, wherein the controlling the vehicle component further comprises, responsive to determining that the following position is within the predicted null position, causing the vehicle component to adjust the following position such that the adjusted following position is outside of the predicted null position.

Example 4: The method of example 1, 2, or 3, wherein the controlling the vehicle component further comprises: responsive to determining that the following position is closer to the target than the selected position, causing the vehicle component to adjust the following position by retreating the host vehicle away from the target; or responsive to determining that the following position is not closer to the target than the selected position, causing the vehicle component to adjust the following position by advancing the host vehicle toward the target.

Example 5: The method of any preceding example, wherein the controlling the vehicle component further comprises: responsive to determining that the following position is not within the predicted null position and that the following position is closer to the target than the selected position, causing the vehicle component to adjust the following position by retreating the host vehicle an incremental amount away from the target; or responsive to determining that the following position is not within the predicted null position and that the following position is not closer to the target than the selected position, causing the vehicle component to adjust the following position by advancing the host vehicle an incremental amount toward the target.

Example 6: The method of any preceding example, further comprising: continuing to adjust the following position until the quality of the V2V connection satisfies the threshold; and updating the predicted null position based on a following position when the quality of the V2V connection satisfies the threshold.

Example 7: The method of any preceding example, further comprising determining the predicted null position of the V2V connection.

Example 8: The method of any preceding example, wherein the determining the predicted null position of the V2V connection is based on a height of an antenna of the host vehicle and a height of an antenna of the target.

Example 9: The method of any preceding example, further comprising determining the height of the antenna of the target based on information received from the target over the V2V connection.

Example 10: The method of any preceding example, wherein: the vehicle component comprises a cruise-control function that controls at least one of: acceleration or braking of the host vehicle; and the selected position is a selected following position behind the target.

Example 11: A system configured to be disposed in a host vehicle, the system comprising: at least one processor configured to: determine whether a quality of a V2V connection between the host vehicle and a target satisfies a threshold that corresponds to a reliable connection between the host vehicle and the target; and responsive to a determination that the quality of the V2V connection satisfies the threshold, maintain a following position of the host vehicle relative to the target; or responsive to a determination that the quality of the V2V connection does not satisfy the threshold, determine whether the following position is within a predicted null position of the V2V connection, the predicted null position corresponding to one or more following positions where the quality of the V2V connection does not satisfy the threshold; and responsive to a determination that the following position is within the predicted null position, cause a vehicle component of the host vehicle to advance or retreat the host vehicle out of the predicted null position; or responsive to a determination that the following position is not within the predicted null position, cause the vehicle component to advance or retreat an incremental amount.

Example 12: The system of example 11, wherein the processor is further configured to: retreat the host vehicle away from the target responsive to a determination that the following position is closer to the target than a selected position; or advance the host vehicle toward the target responsive to a determination that the following position is not closer to the target than the selected position.

Example 13: The system of example 11 or 12, wherein the selected position is a selected following position of the vehicle component.

Example 14: The system of example 11, 12, or 13, wherein the processor is further configured to continue causing the vehicle component to advance or retreat the incremental amount until the quality of the V2V connection satisfies the threshold.

Example 15: The system of any of examples 11-14, wherein the processor is further configured to, responsive to the advance or retreat, update the predicted null position based on a following position when the quality of the V2V connection satisfies the threshold.

Example 16: The system of any of examples 11-15, wherein the predicted null position is surrounded by following positions where the quality of the V2V connection does satisfy the threshold.

Example 17: The system of any of examples 11-16, wherein the quality of the V2V connection comprises at least one of: a determined signal strength, packet-loss percentage, or packet-success percentage.

Example 18: The system of any of examples 11-17, wherein: the processor is further configured to determine the predicted null position; and the determination of the predicted null position is based on a height of an antenna of the host vehicle and a height of an antenna of the target.

Example 19: The system of any of examples 11-18, wherein the processor is further configured to determine the height of the antenna of the target based on information received from the target over the V2V connection.

Example 20: Computer-readable storage media comprising instructions that, when executed by at least one processor, cause the processor to: determine whether a quality of a V2V connection between a host vehicle and a target satisfies a threshold that corresponds to a reliable connection between the host vehicle and the target; and responsive to a determination that the quality of the V2V connection satisfies the threshold, maintain a following position of the host vehicle relative to the target; or responsive to a determination that the quality of the V2V connection does not satisfy the threshold, determine whether the following position is within a predicted null position of the V2V connection, the predicted null position corresponding to one or more following positions where the quality of the V2V connection does not satisfy the threshold; and responsive to a determination that the following position is within the predicted null position, cause a vehicle component of the host vehicle to advance or retreat the host vehicle out of the predicted null position; or responsive to a determination that the following position is not within the predicted null position, cause the vehicle component to advance or retreat an incremental amount.

Example 21: A system comprising: a processor configured to perform the method of any of examples 1-10.

Example 22: Computer-readable storage media comprising instructions that, when executed by at least one processor, cause the processor or an associated system to perform the method of any of examples 1-10.

Example 23: A system comprising means for performing the method of any of examples 1-10.

Example 24: A method performed by the system of any of examples 11-19.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method performed by a system of a host vehicle, the method comprising:
   determining whether a quality of a vehicle-to-vehicle (V2V) connection between the host vehicle and a target satisfies a threshold that corresponds to a reliable connection between the host vehicle and the target; and
   responsive to determining that the quality of the V2V connection does not satisfy the threshold:
      determining a following position of the host vehicle relative to the target;
      predicting a null position of the V2V connection based on determined one or more following positions where ground reflections of communications between the host vehicle and the target may cause the quality of the V2V connection to not satisfy the threshold;
      determining whether the following position is within the predicted null position;
      determining whether the following position is closer to the target than a selected position corresponding to a vehicle component that controls the following position; and
      controlling the following position based on whether the following position is within the predicted null position and whether the following position is closer to the target than the selected position.

2. The method of claim 1, wherein the controlling the following position comprises causing the vehicle component to adjust the following position by:
   advancing the host vehicle toward the target; or retreating the host vehicle away from the target.

3. The method of claim 2, wherein the controlling the vehicle component further comprises, responsive to determining that the following position is within the predicted null position, causing the vehicle component to adjust the following position such that the adjusted following position is outside of the predicted null position.

4. The method of claim 3, wherein the controlling the vehicle component further comprises:
   responsive to determining that the following position is closer to the target than the selected position, causing the vehicle component to adjust the following position by retreating the host vehicle away from the target; or
   responsive to determining that the following position is not closer to the target than the selected position, causing the vehicle component to adjust the following position by advancing the host vehicle toward the target.

5. The method of claim 2, wherein the controlling the vehicle component further comprises:
   responsive to determining that the following position is not within the predicted null position and that the following position is closer to the target than the selected position, causing the vehicle component to adjust the following position by retreating the host vehicle an incremental amount away from the target; or
   responsive to determining that the following position is not within the predicted null position and that the following position is not closer to the target than the selected position, causing the vehicle component to adjust the following position by advancing the host vehicle an incremental amount toward the target.

6. The method of claim 5, further comprising:
   continuing to adjust the following position until the quality of the V2V connection satisfies the threshold; and
   updating the predicted null position based on a following position when the quality of the V2V connection satisfies the threshold.

7. The method of claim 1, wherein the predicting the null position of the V2V connection is based further on a height of an antenna of the host vehicle and a height of an antenna of the target.

8. The method of claim 7, further comprising determining the height of the antenna of the target based on information received from the target over the V2V connection.

9. The method of claim 1, wherein:
   the vehicle component comprises a cruise-control function that controls at least one of: acceleration or braking of the host vehicle; and
   the selected position is a selected following position behind the target.

10. A system configured to be disposed in a host vehicle, the system comprising:
    at least one processor configured to:
       determine whether a quality of a vehicle-to-vehicle (V2V) connection between the host vehicle and a target satisfies a threshold that corresponds to a reliable connection between the host vehicle and the target; and
       responsive to a determination that the quality of the V2V connection satisfies the threshold, maintain a following position of the host vehicle relative to the target; or
       responsive to a determination that the quality of the V2V connection does not satisfy the threshold;
          predict a null position of the V2V connection based on determined one or more following positions where ground reflections of communications between the host vehicle and the target may cause the quality of the V2V connection to not satisfy the threshold;
          determine whether the following position is within the predicted null position; and
          responsive to a determination that the following position is within the predicted null position, cause a vehicle component of the host vehicle to advance or retreat the host vehicle out of the predicted null position; or responsive to a determination that the following position is not within the predicted null position, cause the vehicle component to advance or retreat an incremental amount.

11. The system of claim 10, wherein the processor is further configured to:

retreat the host vehicle away from the target responsive to a determination that the following position is closer to the target than a selected position; or advance the host vehicle toward the target responsive to a determination that the following position is not closer to the target than the selected position.

12. The system of claim 11, wherein the selected position is a selected following position of the vehicle component.

13. The system of claim 10, wherein the processor is further configured to continue causing the vehicle component to advance or retreat the incremental amount until the quality of the V2V connection satisfies the threshold.

14. The system of claim 13, wherein the processor is further configured to, responsive to the advance or retreat, update the predicted null position based on a following position when the quality of the V2V connection satisfies the threshold.

15. The system of claim 10, wherein the predicted null position is surrounded by following positions where the quality of the V2V connection does satisfy the threshold.

16. The system of claim 10, wherein the quality of the V2V connection comprises at least one of: a determined signal strength, packet-loss percentage, or packet-success percentage.

17. The system of claim 10, wherein the prediction of the null position is based further on a height of an antenna of the host vehicle and a height of an antenna of the target.

18. The system of claim 17, wherein the processor is further configured to determine the height of the antenna of the target based on information received from the target over the V2V connection.

19. Non-transitory computer-readable storage media comprising instructions that, when executed by at least one processor, cause the processor to:

determine whether a quality of a vehicle-to-vehicle (V2V) connection between a host vehicle and a target satisfies a threshold that corresponds to a reliable connection between the host vehicle and the target; and responsive to a determination that the quality of the V2V connection satisfies the threshold, maintain a following position of the host vehicle relative to the target; or responsive to a determination that the quality of the V2V connection does not satisfy the threshold;

predict a null position of the V2V connection based on determined one or more following positions where ground reflections of communications between the host vehicle and the target may cause the quality of the V2V connection to not satisfy the threshold;

determine whether the following position is within the predicted null position; and responsive to a determination that the following position is within the predicted null position, cause a vehicle component of the host vehicle to advance or retreat the host vehicle out of the predicted null position; or responsive to a determination that the following position is not within the predicted null position, cause the vehicle component to advance or retreat an incremental amount.

20. The non-transitory computer-readable storage media of claim 19, wherein the prediction of the null position is based further on a height of an antenna of the host vehicle and a height of an antenna of the target.

* * * * *